United States Patent
Giffin

(10) Patent No.: US 7,144,221 B2
(45) Date of Patent: Dec. 5, 2006

(54) METHOD AND APPARATUS FOR ASSEMBLING GAS TURBINE ENGINES

(75) Inventor: Rollin George Giffin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 10/903,806

(22) Filed: Jul. 30, 2004

(65) Prior Publication Data
US 2006/0024162 A1   Feb. 2, 2006

(51) Int. Cl.
*F01D 5/14* (2006.01)
(52) U.S. Cl. ............. 416/189; 416/204 R; 416/201 R; 415/199.5
(58) Field of Classification Search .............. 415/199.5, 415/208.3; 416/191, 126, 189, 198 A, 204 R, 416/201 R; 29/889.21
See application file for complete search history.

(56) References Cited

U.S. PATENT DOCUMENTS

| | | | |
|---|---|---|---|
| 3,002,675 A | * | 10/1961 | Howell et al. .............. 417/352 |
| 3,182,898 A | | 5/1965 | Hewson |
| 3,363,831 A | | 1/1968 | Garnier |
| 3,540,682 A | * | 11/1970 | Howard et al. ........... 244/53 R |
| 3,729,957 A | * | 5/1973 | Petrie et al. ................ 60/226.1 |
| 5,402,638 A | | 4/1995 | Johnson |
| 5,402,963 A | | 4/1995 | Carey et al. |
| 5,404,713 A | | 4/1995 | Johnson |

FOREIGN PATENT DOCUMENTS

DE   2055365      11/1970
EP   1510682 A2   3/2005

OTHER PUBLICATIONS

International Search Report; Place of Search—Munich; Dated Nov. 14, 2005; Reference 125954/10706; Application No. 05253031. 8—2315; 3 Pgs.

* cited by examiner

*Primary Examiner*—Ninh H. Nguyen
(74) *Attorney, Agent, or Firm*—Williams Scott Andes; Armstrong Teasdale LLP

(57) ABSTRACT

A method for assembling a fan assembly for a gas turbine engine includes coupling a plurality of fan blades in a row to a rotor disk, wherein each fan blade includes an airfoil having a first sidewall and a second sidewall connected together at a leading edge and a trailing edge, and wherein each airfoil extends radially between a root and a tip. The method also includes coupling at least one shroud to at least one of the plurality of rows of fan blades, such that the shroud is coupled to at least one fan blade tip extending within the same row of fan blades, and coupling at least one row of rotor blades to the shroud, such that the rotor blades extend radially outward from the shroud.

18 Claims, 2 Drawing Sheets

METHOD AND APPARATUS FOR ASSEMBLING GAS TURBINE ENGINES

STATEMENT REGARDING FEDERALLY SPONSORED RESEARCH & DEVELOPMENT

The government may have rights in this invention pursuant to government contract number MDA972-01-3-0002.

BACKGROUND OF THE INVENTION

This invention relates generally to gas turbine engines, and more particularly to methods and apparatus for assembling fan assemblies for gas turbine engines.

One key factor in aircraft engine design may be the installation and integration of the propulsion system with the aircraft system. For example, the cross-sectional area at the leading edge of the propulsion system, known as the frontal area of the propulsion system, may significantly impact the overall performance of an aircraft system. Specifically, a reduced engine frontal area generally simplifies the installation of the propulsion system into the fuselage or the engine nacelle. Moreover, if the engine frontal area is reduced, then the overall weight of the engine is also reduced.

Within at least some known engines, a fan assembly influences and/or dictates the size of the frontal area. More specifically, known fan assemblies are sized to enable predetermined operational requirements, such as fan inlet radius ratio and/or specific flow to be achieved. The fan inlet radius ratio is generally a mechanical constraint, wherein the airflow output available from the fan assembly is directly linked to the wheel speed of the stage and may be limited by the materials used in fabricating the fan assembly. In contrast, the specific flow of the fan assembly may be limited by aerodynamic constraints.

Other known engines include a "fan-on-blade", known as a flade, to enable overall aircraft system requirements, such as reduced noise for commercial supersonic aircraft and engine-to-inlet airflow compatibility. In these engines, fan blades are generally coupled to the last stage of the fan assembly due to the increased inlet radius ratio of these downstream stages. Although beneficial, the use of flades may be limited, and more specifically, flades may not be available for use in engines having a reduced engine frontal area, because of the relatively high tip speed of the downstream rotors in engines having a reduced engine frontal area.

BRIEF DESCRIPTION OF THE INVENTION

In one aspect, a method is provided for assembling a gas turbine engine. The method includes coupling a plurality of fan blades in a row to a disk, wherein each fan blade includes an airfoil having a first sidewall and a second sidewall connected together at a leading edge and a trailing edge, and wherein each airfoil extends radially between a root and a tip. The method also includes coupling at least one shroud to at least one of the plurality of rows of fan blades, such that the shroud is coupled to at least one fan blade tip extending within the same row of fan blades, and coupling at least two rows of rotor blades to the shroud, such that the rotor blades extend radially outward from the shroud, and wherein each rotor blade includes an airfoil having a first sidewall and a second sidewall connected together at a leading edge and a trailing edge.

In another aspect, a fan assembly for a gas turbine engine is provided. The fan assembly includes a plurality of fan blades coupled together such that the fan blades are arranged in a circumferential row extending around a rotor disk, wherein each fan blade includes an airfoil including a first sidewall and a second sidewall connected together at a leading edge and a trailing edge and extends radially between a root and a tip. The fan assembly also includes at least one shroud coupled to at least one of the plurality of fan blade tips and extending circumferentially around the rotor disk, and at least one row of rotor blades extending radially outward from the at least one shroud. Each rotor blade includes an airfoil including a first sidewall and a second sidewall connected together at a leading edge and a trailing edge.

In a further aspect, a gas turbine engine is provided that includes a fan blade assembly including a plurality of fan blades coupled together such that the fan blades are arranged in a circumferential row extending around a rotor disk, wherein each fan blade includes an airfoil including a first sidewall and a second sidewall connected together at a leading edge and a trailing edge and extends radially between a root and a tip. The fan assembly also includes at least one shroud coupled to at least one of the plurality of fan blade tips and extending circumferentially around the rotor disk, and at least two rows of rotor blades extending radially outward from the at least one shroud. Each rotor blade includes an airfoil including a first sidewall and a second sidewall connected together at a leading edge and a trailing edge.

DETAILED DESCRIPTION OF THE INVENTION

Figure 1:
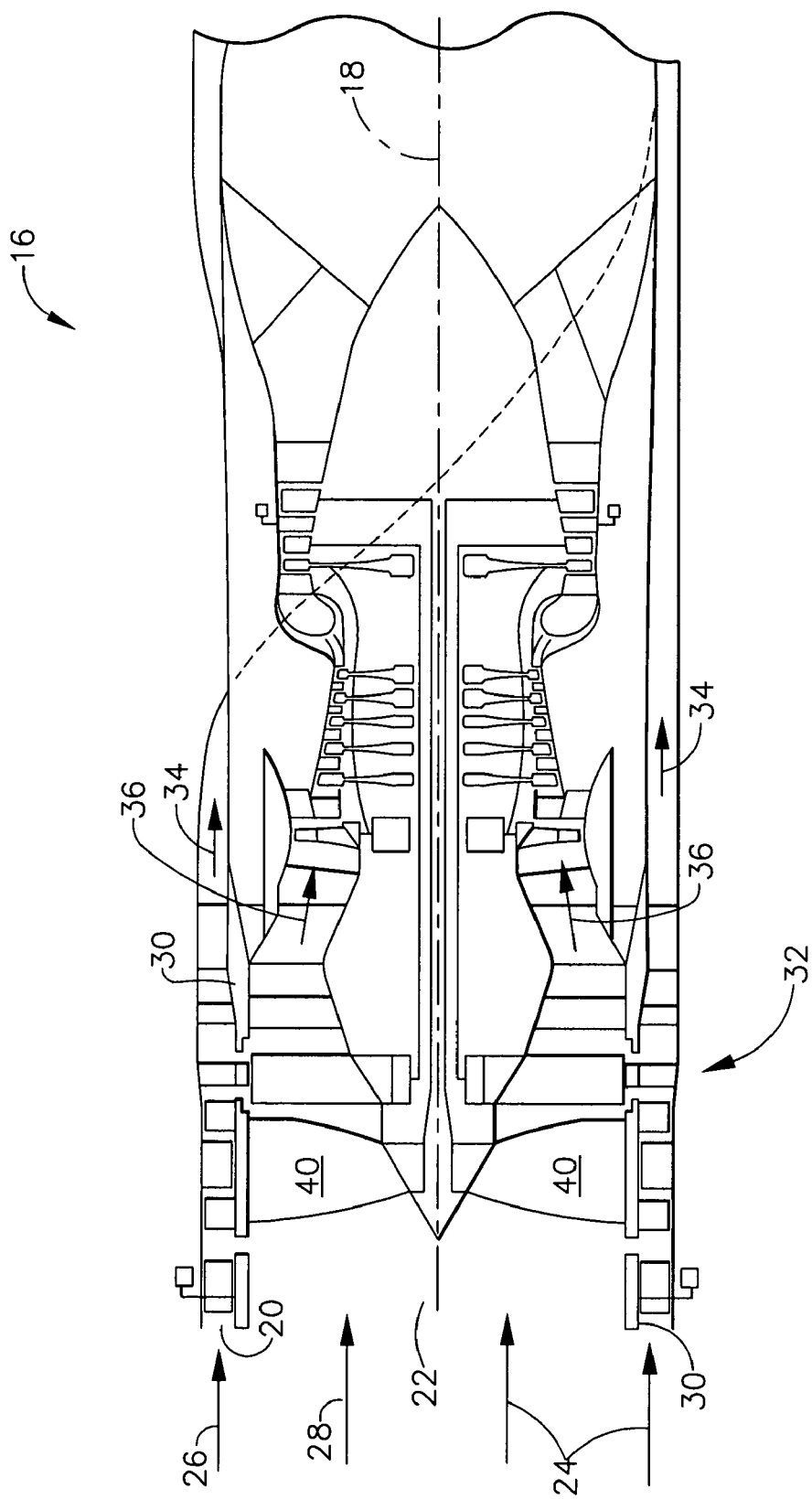
FIG. 1 is a schematic illustration of an exemplary fladed engine.
Figure 2:
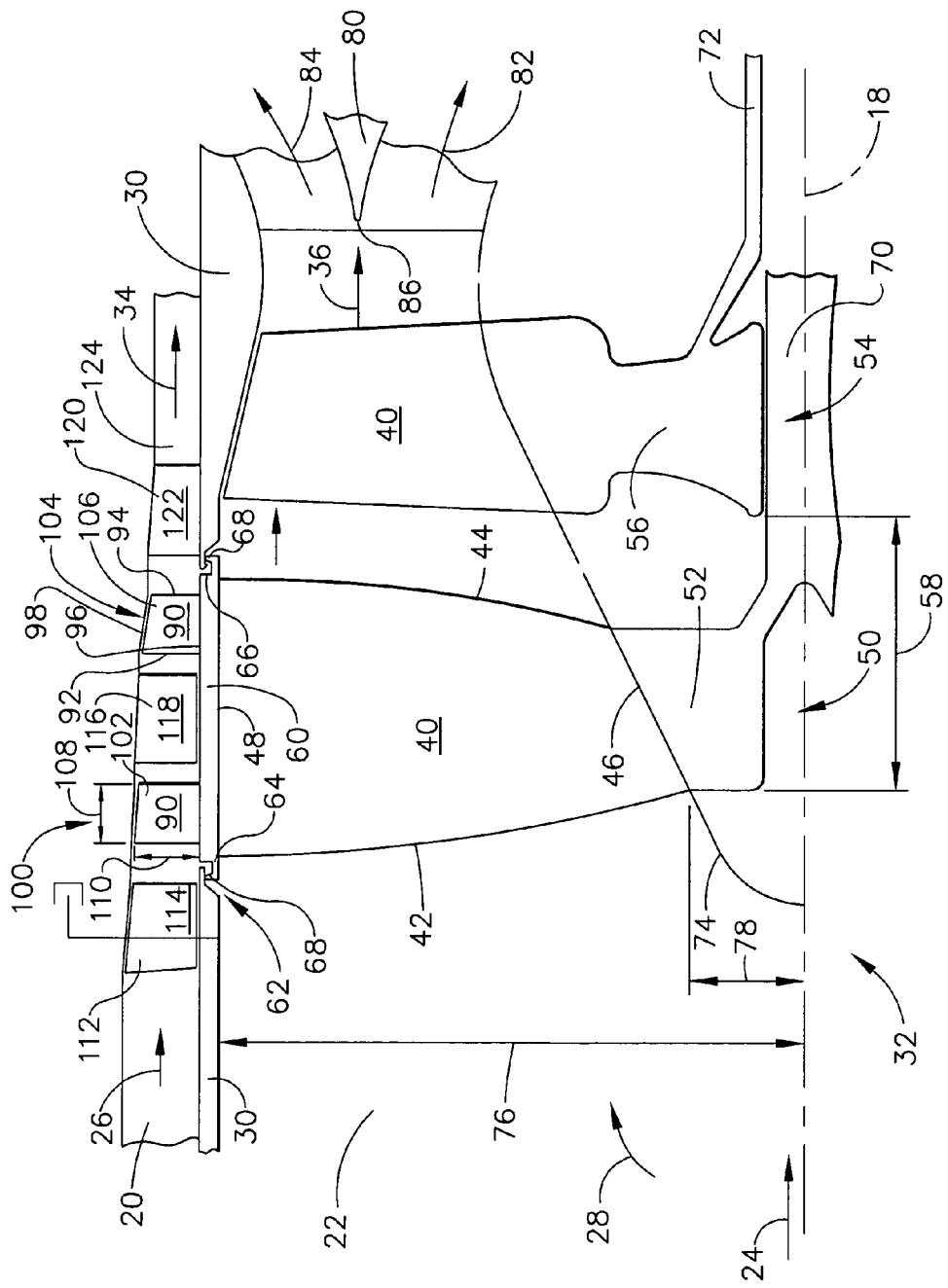
FIG. 2 is a schematic illustration of a portion of the fladed engine shown in FIG. 1.

FIG. 1 is a schematic illustration of an exemplary "fan-on-blade" or fladed engine 16 having an axially oriented engine centerline axis 18. FIG. 2 is a schematic illustration of a portion of fladed engine 16. Engine 16 includes a flade inlet 20 and a fan inlet 22 through which engine inlet airflow 24 enters during engine operations. In the exemplary embodiment, airflow 24 entering flade inlet 20 flows along a flade stream 26, and airflow 24 entering fan inlet 22 flows along a fan stream 28. Flade stream 26 and fan stream 28 are separated by a fan casing 30 extending downstream from fan inlet 22. Fan stream 28 and flade stream 26 are channeled through a fan assembly 32 wherein airflow 24 is compressed and discharged downstream as flade discharge airflow 34 and fan discharge airflow 36. Discharge airflows 34 and 36 facilitate generating thrust to power engine 16.

Fan assembly 32 includes a plurality of fan blades 40. Each fan blade 40 includes a leading edge 42 and a trailing edge 44 and extends radially between a root 46 and a tip 48. In the exemplary embodiment, fan blades 40 are arranged in a two-stage configuration such that fan assembly 32 includes a first fan stage 50 having a first row 52 of circumferentially-spaced fan blades 40, and a second fan stage 54 having a second row 56 of circumferentially-spaced fan blades 40. First and second rows 52 and 56, respectively, are spaced apart an axial distance 58. Distance 58 is variably selected to enable fan assembly 32 to meet operational requirements and to facilitate reducing wake generated in airflow 22 between first and second rows 52 and 56, respectively.

In the exemplary embodiment, a shroud 60 extends circumferentially around, and is coupled to, each fan blade tip 48 within first stage 50. In one embodiment, shroud 60 is a single annular member that is coupled to each fan blade tip 48 within first stage 50. In another embodiment, fan assembly 32 includes a plurality of tip shrouded airfoils such that shroud 60 includes a plurality of arcuate members each coupled to at least one fan blade tip 48 such that the arcuate members extend circumferentially around first stage 50. Specifically, each arcuate member is positioned adjacent other arcuate members to facilitate reducing an amount of air transfer between flade stream 26 and fan stream 28. Shroud 60 is positioned within a cavity 62 defined in fan casing 30 such that shroud 60 is substantially aligned with fan casing 30. In the exemplary embodiment, shroud 60 extends between an upstream side 64 and a downstream side 66, and includes a plurality of seal members 68 extending between each respective shroud side 64 and 66, and fan casing 30. As such, shroud 60 facilitates preventing airflow flowing from fan stream 28 to flade stream 26, or vice-versa.

Fan assembly first stage 50 is rotatably coupled to, and driven by, a first shaft 70, and fan assembly second stage 54 is rotatably coupled to, and driven by, a second shaft 72. First and second shafts 70 and 72 operate independently with respect to each other, such that first shaft 70 operates with a first rotational speed that is different than a second rotational speed of second shaft 72. Accordingly, first stage 50 and second stage 54 have different operational speeds. In the exemplary embodiment, second shaft 72 operates with a faster rotational speed than first shaft 70, such that second stage 54 operates at a faster rotational speed than first stage 50. Moreover, in the exemplary embodiment, second shaft 72 rotates in an opposite direction than first shaft 70. In an alternative embodiment, first stage 50 and second stage 54 operate with the same rotational speed and/or in the same rotational direction.

In the exemplary embodiment, fan stream 28 is defined between fan casing 30 and a rotor hub 74. Moreover, fan stream 28 has a fan inlet radius ratio that is defined as an inlet hub radius 78 divided by an inlet tip radius 76, wherein inlet tip radius 76 is measured with respect to centerline axis 18 and fan blade tips 48, and inlet hub radius 78 is measured with respect to centerline axis 18 and an intersection of hub 74 and blade roots 46. In the exemplary embodiment, the first stage fan inlet radius ratio is smaller than the second stage fan inlet radius ratio as necessitated by the increased density into second stage 54. In one embodiment, first stage 50 is designed with a fan inlet radius ratio that is between approximately 0.1 and 0.3. In another embodiment, first stage fan inlet radius ratio is between approximately 0.1 and 0.15. First stage fan inlet radius ratio is selected to facilitate improving a flow per unit frontal area and the overall performance of engine 16, while satisfying overall engine performance requirements. Accordingly, because the fan inlet radius ratio is reduced in comparison to other known engines, first stage 50 has a reduced rotational speed and a reduced fan blade tip speed. Moreover, because of the reduced rotational speed of first stage 50, first stage 50 has a reduced pressure ratio. Accordingly, in order for engine 16 to satisfy overall performance requirements, second stage 54 has a higher rotational speed and a higher fan blade tip speed than that of first stage 50.

In operation, fan stream 28 flows through fan inlet 22 and is channeled towards first stage 50 between fan casing 30 and hub 74. As fan stream 28 is channeled through first row 52 of fan blades 40, the density of fan stream 28 is increased. Fan stream 28 is then channeled through second row 56 of fan blades 40 wherein the density of fan stream 28 is further increased.

In the exemplary embodiment, engine 16 includes a splitter 80 downstream from second row 56. Splitter 80 facilitates dividing fan stream 28 into a core stream 82 and a bypass stream 84. More specifically, splitter 80 is oriented to facilitate dividing fan stream 28 to enable engine 16 to meet engine overall performance requirements relating to thrust and airflow pressure ratios.

Fan assembly 32 also includes a plurality of fladed rotor blades 90. Each fladed blade 90 includes a leading edge 92 and a trailing edge 94 and extends radially between a root 96 and a tip 98. In the exemplary embodiment, blades 90 are arranged in a two stage configuration such that fan assembly 32 includes a first flade stage 100 having a first row 102 of circumferentially spaced fladed blades 90 and a second flade stage 104 having a second row 106 of circumferentially spaced fladed blades 90. In one embodiment, first stage blade tips 98 have an axial length 108 that enables multiple flade stages to be coupled within engine 16, such as, but not limited to, first and second flade stages 100 and 104, respectively.

In the exemplary embodiment, each blade 90 within flade stage 100 and 104 is coupled to shroud 60 at blade root 96 and extends radially outward from shroud 60. In one embodiment, each fladed blade 90 is coupled to shroud 60 via, for example, a welding process, such as, but not limited to, an inductive welding process. In another embodiment, fladed blades 90 are unitarily formed with shroud 60. In the exemplary embodiment, flade stages 100 and 104 are coupled to fan assembly first stage 50. In an alternative embodiment, each blade 90 within flade stages 100 and 104 is coupled to another stage of fan blades 40. In yet another alternative embodiment, flade stages 100 and 104 are coupled to different stages of fan blades 40 other than first stage 50 or second stage 54. In yet another alternative embodiment, fan assembly 32 includes more or less than two flade stages. Moreover, in the exemplary embodiment, because of the relatively low rotational speed of blades 40 within first stage 50, fladed blades 90 have a radial height 110, extending between blade root 96 and blade tip 98, that is selected to facilitate improving an efficiency potential of flade stream 28, while reducing the risk of exceeding tip speed constraints.

In the exemplary embodiment, fan assembly 32 includes a row 112 of circumferentially spaced variable area inlet guide vanes 114. Inlet guide vanes 114 are positioned upstream of first flade stage 100 and are operable to channel airflow towards first stage 100 of fladed blades 90. Inlet guide vanes 114 meter the volume of airflow entering flade stream 26 and direct the airflow towards first flade stage 100. As the airflow is channeled through first flade stage 100, the airflow is compressed. Airflow discharged from first flade stage 100 passes through a row 116 of circumferentially spaced intermediate guide vanes 118 which changes the direction of airflow to facilitate reducing the rotary velocity component of the airflow. The airflow is then channeled towards second flade stage 104. As the airflow is channeled through second flade stage 104, the airflow is compressed. The airflow discharged from second flade stage 104 passes through a row 120 of circumferentially spaced outlet guide vanes 122 which change the direction of the airflow to facilitate reducing the rotary velocity component of the airflow. Flade stream 26 is then channeled downstream through a flade duct 124 prior to being exhausted. Accordingly, flade stream 26 increases an amount of high pressure airflow available, thus facilitating increasing the overall performance and/or thrust of engine 16.

The above-described flade engine includes a reduced diameter fan assembly. The fan assembly includes first and second rows of flades coupled to a first row of fan blades. The multiple stages of flades facilitate increasing an amount of pressurized airflow available for the engine. Accordingly, the amount of pressurized airflow that is required for the fan blades to produce is reduced. As a result, the overall diameter of the fan assembly is reduced, thereby decreasing the overall weight of the engine, and increasing the ease of installation of the engine.

Exemplary embodiments of a fan assembly are described above in detail. The fan assembly is not limited to the specific embodiments described herein, but rather, components of each fan assembly may be utilized independently and separately from other components described herein. For example, each fan assembly component can also be used in combination with other fan assembly components.

While the invention has been described in terms of various specific embodiments, those skilled in the art will recognize that the invention can be practiced with modification within the spirit and scope of the claims.

What is claimed is:

1. A method for assembling a gas turbine engine, said method comprises:
    coupling a plurality of rows of fan blades in a row to a rotor disk, wherein each fan blade includes an airfoil having a first sidewall and a second sidewall connected together at a leading edge and a trailing edge, and wherein each airfoil extends radially between a root and a tip;
    coupling at least one shroud to at least one of the plurality of rows of fan blades, such that the shroud is coupled to at least one fan blade tip extending within the same row of fan blades;
    coupling at least a first row of rotor blades and a second row of rotor blades to the shroud, such that the rotor blades extend radially outward from the shroud, and wherein each rotor blade includes an airfoil having a first sidewall and a second sidewall connected together at a leading edge and a trailing edge; and
    positioning the first row of rotor blades upstream of the second row of rotor blades.

2. A method in accordance with claim 1 wherein coupling at least one shroud comprises coupling a single shroud member circumferentially around each fan blade tip extending within the same row of fan blades.

3. A method in accordance with claim 1 wherein coupling a plurality of fan blades in a row further comprises coupling a first row of fan blades and a second row of fan blades to the rotor disk, wherein the first row of fan blades is upstream from the second row of fan blades.

4. A method in accordance with claim 3 wherein coupling at least one shroud to at least one of the plurality of rows of fan blades further comprises coupling the annular shroud to the first row of fan blades.

5. A method in accordance with claim 1 wherein coupling a second row of rotor blades downstream from the first row of rotor blades further comprises coupling the second row of rotor blades downstream from the first row of rotor blades such that a circumferential row of stator blades extends between the first and second rows of rotor blades.

6. A method in accordance with claim 1 wherein coupling a plurality of fan blades in a row to a disk further comprises coupling a first row of fan blades to the rotor disk and coupling a second row of fan blades to a second rotor disk such that the first row of fan blades has a first rotational speed, and the second row of fan blades has a second rotational speed that is different than the first rotational speed.

7. A fan assembly for a gas turbine engine, said fan assembly comprises:
    a plurality of fan blades coupled together such that said fan blades are arranged in a circumferential row extending around a rotor disk, wherein each said fan blade comprises an airfoil comprising a first sidewall and a second sidewall connected together at a leading edge and a trailing edge and extends radially between a root and a tip;
    at least one shroud coupled to at least one of said plurality of fan blade tips and extending circumferentially around the rotor disk; and
    at least a first row of rotor blades and a second row of rotor blades extending radially outward from said at least one shroud, said first row of rotor blades is positioned upstream of said second row of rotor blades and each said rotor blade comprises an airfoil comprising a first sidewall and a second sidewall connected together at a leading edge and a trailing edge.

8. A fan assembly in accordance with claim 7 wherein said at least one shroud comprises an annular member extending circumferentially around each of said plurality of blade tips.

9. A fan assembly in accordance with claim 7 wherein said plurality of fan blades are arranged in a first row of fan blades and a second row of fan blades.

10. A fan assembly in accordance with claim 9 wherein said first row of fan blades has a first rotational speed, and said second row of fan blades has a second rotational speed that is different than the first rotational speed.

11. A fan assembly in accordance with claim 9 wherein said at least one shroud extends circumferentially around said first row of fan blades.

12. A fan assembly in accordance with claim 11 further comprising a circumferential row of stators coupled between said first and second rows of fan blades.

13. A gas turbine engine comprising:
    a fan blade assembly comprising a plurality of fan blades coupled together such that said fan blades are arranged in a circumferential row extending around a rotor disk, wherein each said fan blade comprises an airfoil comprising a first sidewall and a second sidewall connected together at a leading edge and a trailing edge and extends radially between a root and a tip, at least one shroud coupled to at least one of said plurality of fan blade tips and extending circumferentially around the rotor disk, and at least a first row of rotor blades and a second row of rotor blades extending radially outward from said at least one shroud, wherein said first row of rotor blades is positioned upstream of said second row of rotor blades and each said rotor blade comprises an airfoil comprising a first sidewall and a second sidewall connected together at a leading edge and a trailing edge.

14. A gas turbine engine in accordance with claim 13 wherein said at least one shroud comprises an annular member extending circumferentially around each of said plurality of blade tips.

15. A gas turbine engine in accordance with claim 13 wherein said plurality of fan blades are arranged in a first row of fan blades and a second row of fan blades.

16. A gas turbine engine in accordance with claim 15 wherein said first row of fan blades has a first rotational speed, and said second row of fan blades has a second rotational speed that is different than the first rotational speed.

17. A gas turbine engine in accordance with claim 15 wherein said at least one shroud extends circumferentially around said first row of fan blades.

18. A gas turbine engine in accordance with claim 13 further comprising a circumferential row of stators coupled between said first and second rows of rotor blades.

* * * * *